United States Patent
Cosentino et al.

(10) Patent No.: US 8,776,075 B2
(45) Date of Patent: Jul. 8, 2014

(54) ENERGY CONSUMPTION OPTIMIZATION IN A DATA-PROCESSING SYSTEM

(75) Inventors: Davide Cosentino, Palermo (IT); Scot MacLellan, Rome (IT); Ivan Orlandi, Rome (IT); Ignazio Flavio Trovato, Rome (IT)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/225,450

(22) Filed: Sep. 4, 2011

(65) Prior Publication Data
US 2012/0110585 A1    May 3, 2012

(30) Foreign Application Priority Data

Oct. 29, 2010 (EP) .................................... 10189402

(51) Int. Cl.
| | | |
|---|---|---|
| *G06F 9/46* | (2006.01) | |
| *G06F 15/173* | (2006.01) | |
| *G06F 1/00* | (2006.01) | |
| *G06F 1/26* | (2006.01) | |
| *G06F 1/32* | (2006.01) | |

(52) U.S. Cl.
USPC ........... 718/104; 718/100; 718/102; 709/223; 709/224; 709/226; 713/300; 713/310; 713/320; 713/324

(58) Field of Classification Search
None
See application file for complete search history.

(56) References Cited

U.S. PATENT DOCUMENTS

| | | | | |
|---|---|---|---|---|
| 5,566,084 | A * | 10/1996 | Cmar | 700/276 |
| 7,197,433 | B2 * | 3/2007 | Patel et al. | 702/188 |
| 8,397,088 | B1 * | 3/2013 | Ghose | 713/300 |
| 2003/0188543 | A1 | 10/2003 | Trecate | |
| 2007/0225871 | A1 * | 9/2007 | Karstens | 700/299 |
| 2009/0007128 | A1 | 1/2009 | Borghettit et al. | |
| 2009/0265568 | A1 * | 10/2009 | Jackson | 713/320 |
| 2010/0037225 | A1 | 2/2010 | Doyle et al. | |
| 2010/0057641 | A1 * | 3/2010 | Boss et al. | 705/412 |
| 2010/0241881 | A1 * | 9/2010 | Barsness et al. | 713/320 |
| 2010/0318227 | A1 * | 12/2010 | Steinberg et al. | 700/278 |
| 2011/0265092 | A1 * | 10/2011 | Ohtani | 718/104 |
| 2012/0158206 | A1 * | 6/2012 | Longobardi et al. | 700/300 |

OTHER PUBLICATIONS

Naone, Erica, "Saving Energy in Data Centers," MIT Technology Review, Mar. 2008, available at http://www.technologyreview.com/business/20388/.

* cited by examiner

*Primary Examiner* — Charles Swift
(74) *Attorney, Agent, or Firm* — Nelson and Nelson; Daniel P. Nelson; Alexis V. Nelson

(57) ABSTRACT

A method for optimizing energy consumption in a data-processing system comprising a set of data-processing units is disclosed. In one embodiment, such a method includes indicating a set of data-processing jobs to be executed on a data-processing system during a production period. An ambient temperature expected for each data-processing unit during the production period is estimated. The method calculates an execution scheme for the data-processing jobs on the data-processing system. The execution scheme optimizes the energy consumed by the data-processing system to execute the data-processing jobs based on the ambient temperature of the data-processing units. The method then executes the data-processing jobs on the data processing system according to the execution scheme. A corresponding apparatus and computer program product are also disclosed.

21 Claims, 9 Drawing Sheets

ENERGY CONSUMPTION OPTIMIZATION IN A DATA-PROCESSING SYSTEM

RELATED APPLICATIONS

This application claims priority to European Patent Application No. 10189402.0 filed on Oct. 29, 2010 and entitled ENERGY CONSUMPTION OPTIMIZATION IN A DATA-PROCESSING SYSTEM.

BACKGROUND

Background of the Invention

Data-processing systems (including one or more data-processing centers at different locations) are commonly used to execute large numbers of data-processing jobs. Typical examples include data-processing centers of large organizations (which execute internal software applications supporting core business and operational activities of the organizations), or data-processing centers of Internet companies (which provide large-scale services over the Internet). For such purposes, data-processing centers generally include very large numbers (e.g., hundreds) of computers.

A critical issue with data-processing centers is their electrical energy consumption. The larger number of computers in a data-processing center, the larger amount of energy that is consumed. The amount of energy consumed by computers is directly related to their processing power (defined by their operative frequency). Energy is also consumed by associated infrastructure (e.g., uninterruptible power supplies, power distribution units, lighting systems, etc.) and may be lost in the form of heat dissipated by computers during their operation. Data-processing centers accordingly require complex cooling systems to maintain and monitor the temperature of computers contained therein. Such cooling systems consume additional energy. A large data-processing center (such as one encountered in a large Internet company) can consume tens of megawatt hours (MWh) of energy.

The large amount of energy consumed by data-processing centers involves a corresponding cost (which may be on the order of 10 percent of the total cost of ownership, or TCO, of the data-processing centers). Energy consumed by data-processing centers can also have a serious impact on the environment as it relates to pollution. It has been estimated that data-processing centers are responsible for about 0.3-0.5 percent of global $CO_2$ emissions. This contribution is expected to increase in the future with the increasing prevalence of cloud computing, where services are provided over the Internet.

In view of the foregoing, what are needed are new apparatus and methods to reduce the energy consumed by data-processing systems.

SUMMARY

The invention has been developed in response to the present state of the art and, in particular, in response to the problems and needs in the art that have not yet been fully solved by currently available apparatus and methods. Accordingly, the invention has been developed to provide apparatus and methods to reduce the energy consumed by data-processing systems. The features and advantages of the invention will become more fully apparent from the following description and appended claims, or may be learned by practice of the invention as set forth hereinafter.

Consistent with the foregoing, a method for optimizing energy consumption in a data-processing system comprising a set of data-processing units is disclosed herein. In one embodiment, such a method includes indicating a set of data-processing jobs to be executed on a data-processing system during a production period. An ambient temperature expected for each data-processing unit during the production period is estimated. The method calculates an execution scheme for the data-processing jobs on the data-processing system. The execution scheme optimizes the energy consumed by the data-processing system to execute the data-processing jobs based on the ambient temperature of the data-processing units. The method then executes the data-processing jobs on the data processing system according to the execution scheme.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
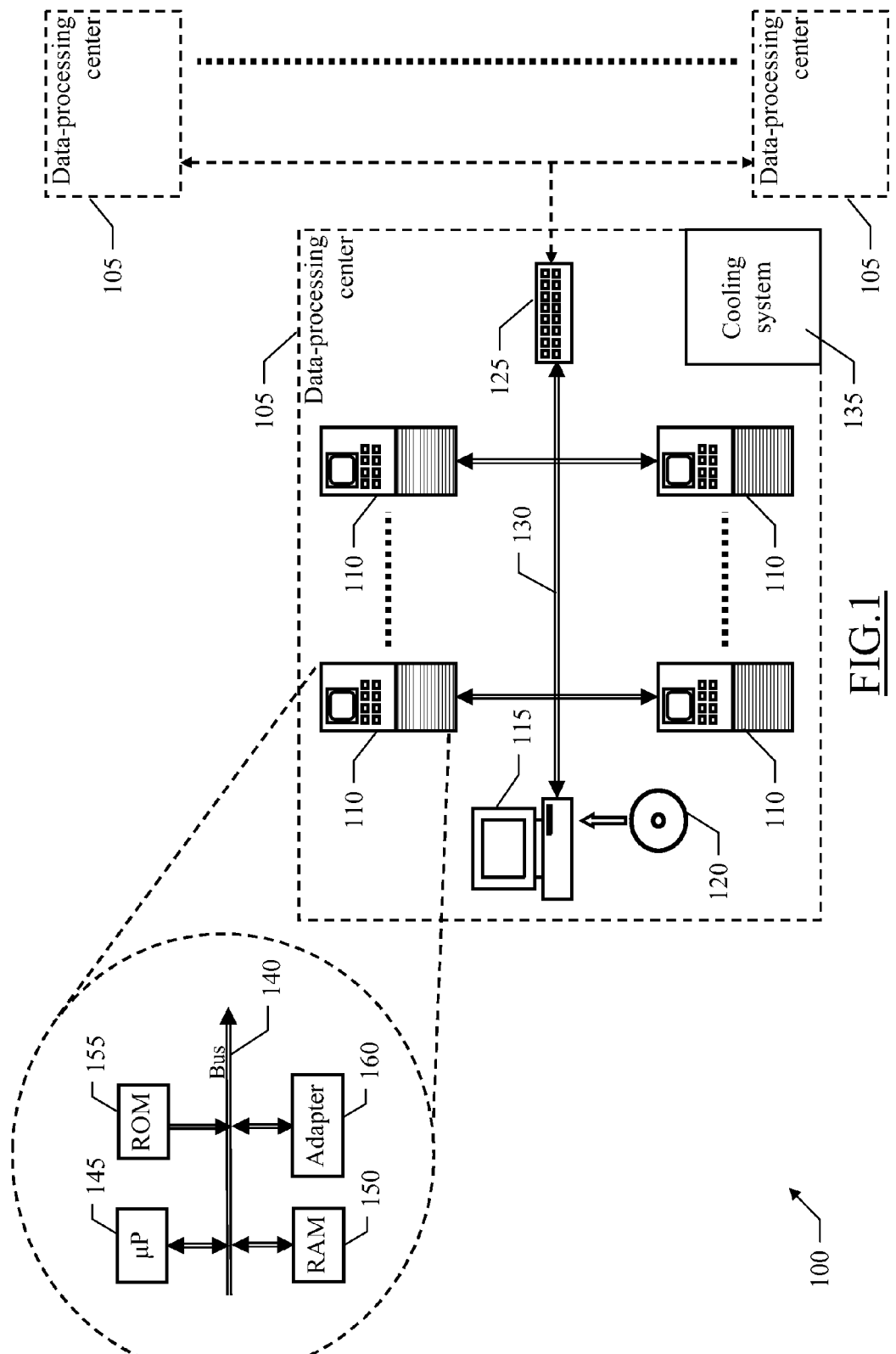
FIG. 1 is a schematic block diagram showing one embodiment of a data-processing system in which a solution in accordance with the invention may be applicable.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with an instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. The computer program instructions may also potentially be distributed across multiple computers or programmable data processing apparatus for execution thereon.

Referring to FIG. 1, a schematic block diagram of one embodiment of a data-processing system 100 (in which a solution in accordance with the invention may be applicable) is shown. The data-processing system 100 includes one or more data-processing centers 105 (generally at different locations, possibly far away from one another). Each data-processing center 105 includes a set of one or more data-processing units 110, such as computers (e.g., rack or blade servers). The data-processing center 110 also includes a console 115 (e.g., a personal computer 115 with a drive for reading DVD- and/or CD-ROMs 120) for operating the data-processing units 110. A router (or switch) system 125 manages communications among the computers 110 and the console 115, as well as with systems outside of the data-processing center 105, such as other data-processing centers 105. The computers 110 and the console 115 may be connected to the router system 125 through a cabling system 130. The data-processing center 105 may also include a cooling system 135 to monitor and maintain the temperature of the data-processing center 105 at a value (typically between 16 and 24° C.) to enable correct operation of the computers 110. The cooling system 135 may also be used to control the humidity of the data-processing center 105 (typically in the range of 40 to 55 percent, with a maximum dew point of 12 to 16° C.). For example, the cooling system 135 may include (in-row or in-rack) liquid coolers, mechanical chillers, computer room air conditioners (CRACs), or computer room air handlers (CRAHs). Ideally, the cooling system 135 is (at least in part) the free-cooling type, so as to exploit cold air from outside the data-processing center 105.

A generic computer 110 may be formed from several units that are connected in parallel to a communication bus 140. For example, a set of one or more microprocessors (μP) 145 may control operation of the computer 110. A RAM 150 may be used as a working memory by the microprocessor(s) 145, and a ROM 155 may be used to store basic code to bootstrap the computer 110. The computer 110 may also include a network adapter 160 to connect the computer 110 to the cabling system 130.

A specific computer 110 of the data-processing center 105 may operate as a control server to control the other computers of the data-processing center 105 (referred to as execution servers). The control server may monitor operation of the execution servers to detect any critical conditions that may occur therein. The control server may manage the execution of data-processing jobs, or simply jobs, on the execution servers during a production period (e.g., day, week, etc.). The jobs may involve batch (i.e., non-interactive) applications such as payroll or cost analysis programs.

In a solution in accordance with the invention, an ambient temperature for each execution server during the production period is estimated (e.g., by setting the ambient temperature of all execution servers of each data-processing center 105 equal to an external temperature of the corresponding location as retrieved from a weather forecast service). An execution scheme of the jobs is then calculated to define how the jobs should be executed. This may include determining at which time, on which execution server, and/or with which data-processing resources the jobs will be executed. This execution scheme may be calculated to optimize the data-processing system 100 to execute the jobs according to the ambient temperature of the execution servers. The jobs may then be executed on the data-processing system according to the execution scheme.

Figure 2A:
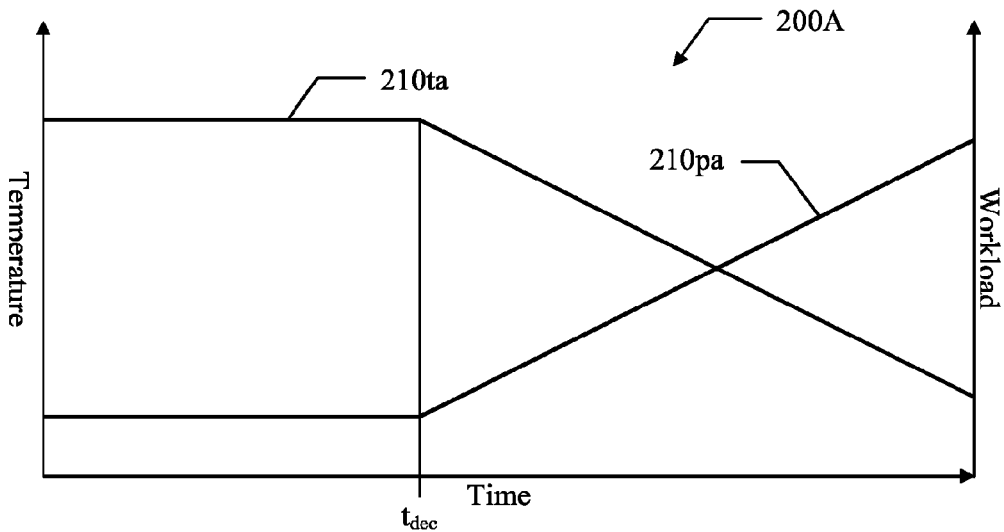
FIGS. 2A and 2B show various different scenarios for applying a solution in accordance with the invention.
Figure 2B:
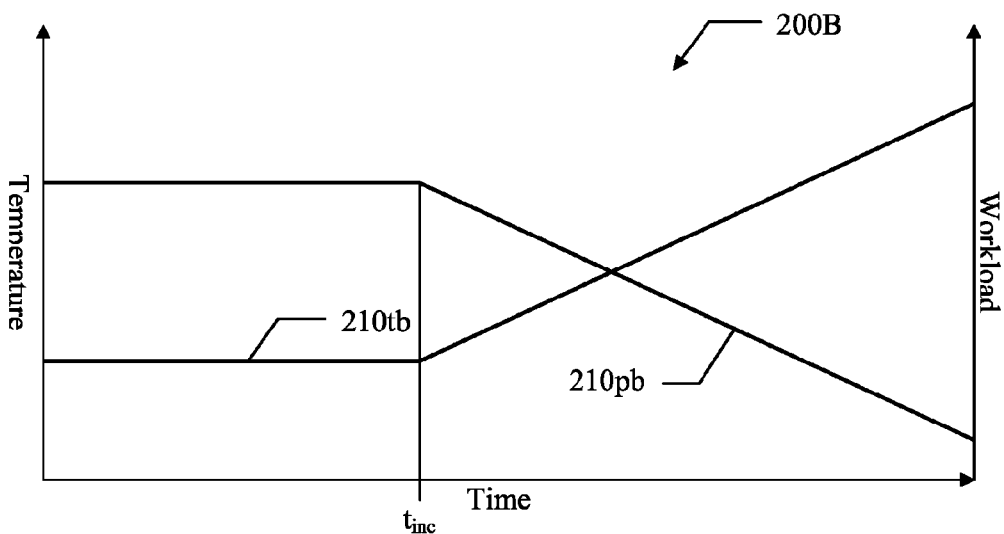

Different exemplary scenarios for applying a solution in accordance with the invention are shown in FIGS. 2A and 2B. FIG. 2A includes a qualitative diagram 200A with a temperature curve 210$ta$ and a workload curve 210$pa$. The temperature curve 210$ta$ and the workload curve 210$pa$ plot an ambient temperature and a workload (on the ordinate axis) as a function of time (on the abscissa axis) for a generic execution server during the production period. As can be seen, the temperature curve 210*ta* indicates that the ambient temperature is expected to decrease over time, starting from a time $t_{dec}$. In this case it is possible to increase the workload of the execution server after time $t_{dec}$ (such as by increasing its processing frequency). In this way, most of the energy consumed by the execution server may occur when the ambient temperature is lower and, cooling is easier.

FIG. 2B includes another qualitative diagram 200B with a temperature curve 210*tb* and a workload curve 210*pb* (again plotting the ambient temperature and the workload as a function of time for the same execution server during the production period). In this diagram, the temperature curve 210*tb* indicates that the ambient temperature is expected to increase over time, starting from a time $t_{inc}$. In this case it is better to decrease the workload of the execution server after time $t_{inc}$. In this way, most of the energy consumed by the execution server may occur when the ambient temperature is lower and cooling is easier.

The above-described solution exploits climate conditions to find the best time to operate and cool computers of the data-processing system. This can make any free-cooling systems more effective and/or to optimize the use of heat produced by the data-processing system for other applications. In addition to reducing energy consumed by the data-processing system, it also reduces energy consumed by the cooling system. This reduces the cost of operating the data-processing system and reduces impacts (e.g., pollution) on the environment. These cost savings may be achieved without structurally altering the data-processing system, such as by moving the data-processing system to another location. The above-described solution uses a proactive approach, where energy consumed by the data-processing system is anticipated to optimize the energy consumption of the data-processing system.

Figure 3:
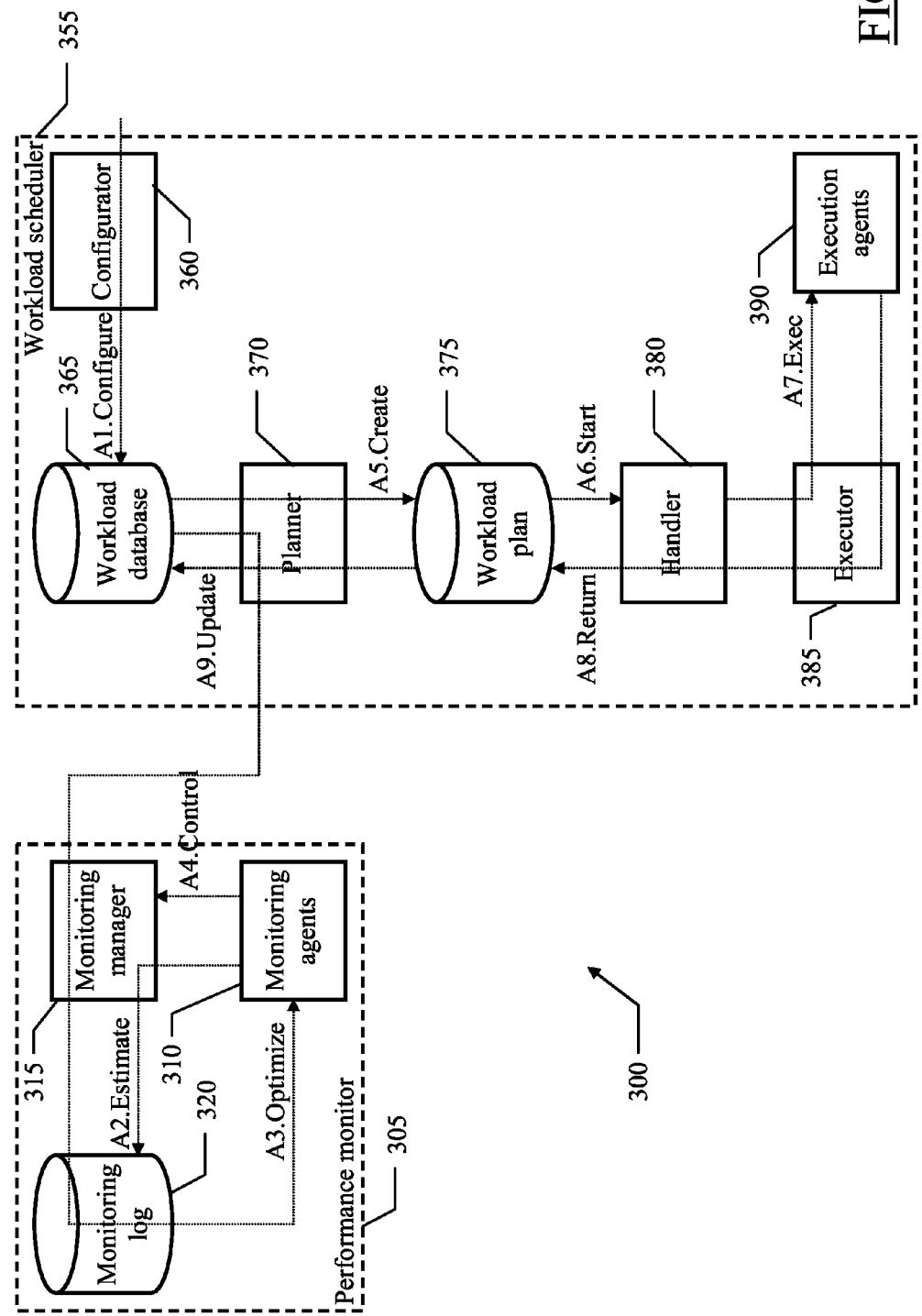
FIG. 3 is a collaboration diagram representing roles of software components that may be used to implement a solution in accordance with the invention.

FIG. 3 is a collaboration diagram showing roles of software components that may be used to implement a solution in accordance with the invention. The software components are denoted as a whole by reference numeral 300. Programs and data are typically stored on a hard-disk and loaded (at least partially) into a working memory of each corresponding computer when the programs are running, together with an operating system and other application programs. The programs may be initially installed onto the hard disk from a DVD-ROM or other storage media. FIG. 3 describes a static structure of the system (by means of the corresponding software components) and its dynamic behavior (by means of a series of exchanged messages, each representing a corresponding action, denoted with sequence numbers preceded by the symbol "A").

A performance monitor 305, such as the IBM Tivoli Monitoring (ITM) product produced by IBM Corporation, runs on the control server of each data-processing center. The performance monitor 305 monitors operation of the execution servers of the data-processing center to detect any critical conditions thereon.

The performance monitor 305 includes a set of monitoring agents 310, which are used to measure predefined state parameters (or metrics) relevant to the operation of the data-processing center (either as a whole or for each execution server individually). For example, the monitoring agents 310 may measure the usage of hardware and/or software resources of each execution server (such as its processing power, as defined by a corresponding processing frequency). A specific monitoring agent 310, such as the IBM ITM for Energy Management (ITMfEM), may measure the energy consumed by each execution server.

The state parameters measured by the monitoring agents 310 (or at least the parameters relating to the detection of critical conditions) are collected by a monitoring manager 315 running on the control server. The monitoring manager 315 saves the state parameters in a monitoring log 320 to perform tasks such as off-line analysis). The monitoring manager 315 determines corrective actions (such as using a decision tree based on values of the state parameters of the critical conditions) for recovering the proper operation of the data-processing center, and enforces their application.

A workload scheduler 355, or simply scheduler, 355 (such as the IBM Tivoli Workload Scheduler (TWS) by IBM Corporation) runs on the same control server. The scheduler 355 controls the execution of batches of jobs on the execution servers during production periods.

In the illustrated embodiment, the scheduler 305 includes a configurator 360 (such as the Composer module in the IBM TWS) to configure a workload database 365. The workload database 365 contains definitions of execution servers that are available to the scheduler 355. Each execution server may be defined by information needed to access it, such as host name, IP address, and the like, together with its physical/logical characteristics, such as processing power, memory size, operating system, and the like. The workload database 365 also includes a job descriptor of each job. The job descriptor specifies the programs to be invoked, along with their arguments and environmental variables. The job descriptor also defines an execution policy of the job. For example, the execution policy may indicate the execution servers on which the job may be executed, such as using their names (i.e., predefined) or characteristics (i.e., to be selected at runtime). The execution policy also indicates a run-cycle of the job to define when it should be executed.

Optionally, the execution policy indicates any execution constraints associated with the job. Temporal execution constraints may limit when the job can be executed, resource execution constraints may identify resources (e.g., specific software programs) that are required for execution of the job, and dependency execution constraints may indicate conditions that must be met before the job can be executed (e.g., the completion of other jobs). The workload database 365 also stores statistic information relating to previous executions of the jobs, such as a log of their duration. Typically, the workload database 365 is maintained by application developers, which define the jobs, and by system administrators, which define their execution policies.

A planner 370 (such as the Master Domain Manager module in the IBM TWS) is used to create a workload plan, or simply plan, whose definition is stored in a control file 375 (such as the Symphony file in the IBM TWS). The plan specifies the flow of execution of each batch of jobs in the corresponding production period, together with the definition of the corresponding execution servers. A new plan is generally created automatically before every production period. For this purpose, the planner 370 processes the information available in the workload database 365 so as to select the jobs to be executed (according to their run-cycles) and to arrange them in the desired sequence (according to their expected duration and execution constraints). The planner 370 creates the plan by adding the jobs to be executed in the next production period, and by removing the jobs of the previous production period that have been completed. In addition, the jobs of the previous production period that did not complete successfully or that are still running or waiting to be executed may be maintained in the plan for execution during the next production period.

The scheduler 355 also includes a handler 380 (such as the Batchman module in the IBM TWS), which extracts the plan from the control file 375 and initiates it at the beginning of each production period. The handler 380 submits each job of the plan for execution as soon as possible on the corresponding execution server (either defined statically or selected at run-time among the available execution servers having the required characteristics). The actual execution of the jobs is managed by an executor 385 (such as the Jobman process in the IBM TWS). The executor 385 interfaces with an execution agent 390 running on each execution server. The execution agent 390 enforces the execution of each job in response to a corresponding request received from the executor 385, and returns feedback information indicating the result of the execution. This may include indicating whether the job has completed successfully, the actual duration of the job, or the like.

The feedback information of each executed job is returned by the executor 385 to the handler 380, which enters it in the control file 375. This provides a real-time picture of a current execution state of all the jobs of the plan. At the end of the production period, the planner 370 extracts the feedback information of all the executed jobs from the control file 375, and updates corresponding statistic information in the workload database 365 accordingly. As usual, the application developers and the system administrator configure the workload database 365 through the configurator 360 (action "A1.Configure").

In a solution in accordance with the invention, the monitoring manager 315 estimates the ambient temperature that is expected at the location of the data-processing center during the next production period, and saves this information in the monitoring log 320 (action "A2.Estimate"). Ideally, this operation is performed by a dedicated monitoring agent 310 that retrieves a corresponding weather forecast, such as from a service provided over the Internet. Before each next production period, the monitoring manager 315 calculates a power cap of each execution server, which defines its processing power (i.e., processing frequency) over the production period. This operation, as described in more detail hereafter, is performed by a dedicated monitoring agent 310 (such as the ITMfEM in the IBM ITM), which calculates the power cap to optimize the energy consumed by the execution server while executing the corresponding jobs. The power cap can be estimated from information extracted from the workload database 365 and ambient temperature information extracted from the monitoring log 320 (action "A3.Optimize"). The monitoring manager 315 controls each execution server accordingly during the production period (action "A4.Control").

As usual, the planner 370 then creates the plan for the next production period (action "A5.Create"). The handler 380 starts this plan at the beginning of the production period (action "A6.Start"). The executor 385 controls the execution of each job of the plan (submitted by the handler 380) through the corresponding execution agent 390 (action "A7.Exec"). The feedback information from each executed job (from the corresponding execution agent 390) is returned by the executor 385 to the handler 380, which enters it into the control file 375 (action "A8.Return"). At the end of the production period, the planner 370 updates statistic information relating to all executed jobs in the workload database 365 according to feedback information extracted from the control file 375 (action "A9.Update").

Figure 4A:
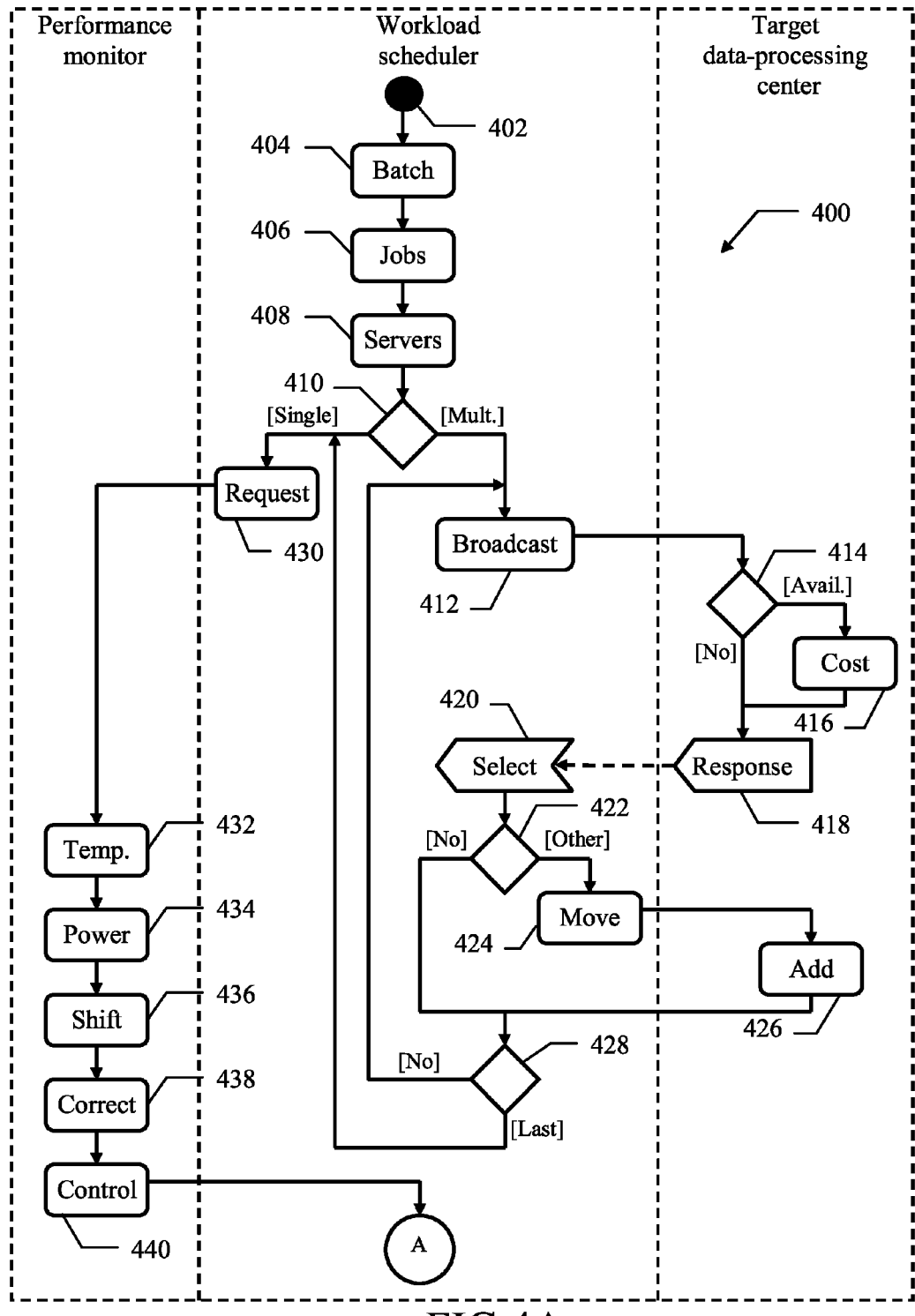
FIGS. 4A through 4C show an activity diagram that describes a flow of activities relating to an implementation of a solution in accordance with the invention.
Figure 4B:
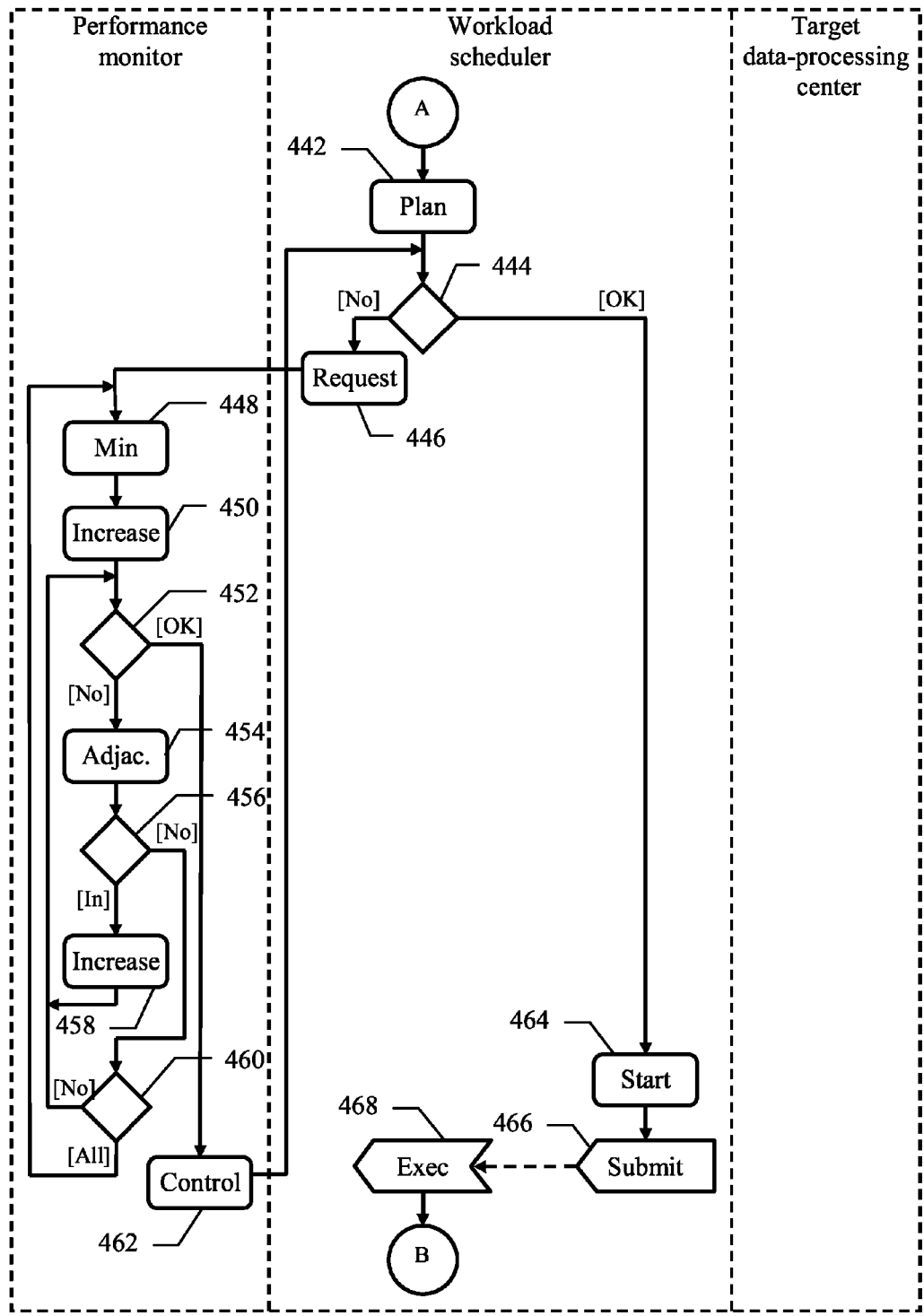
Figure 4C:
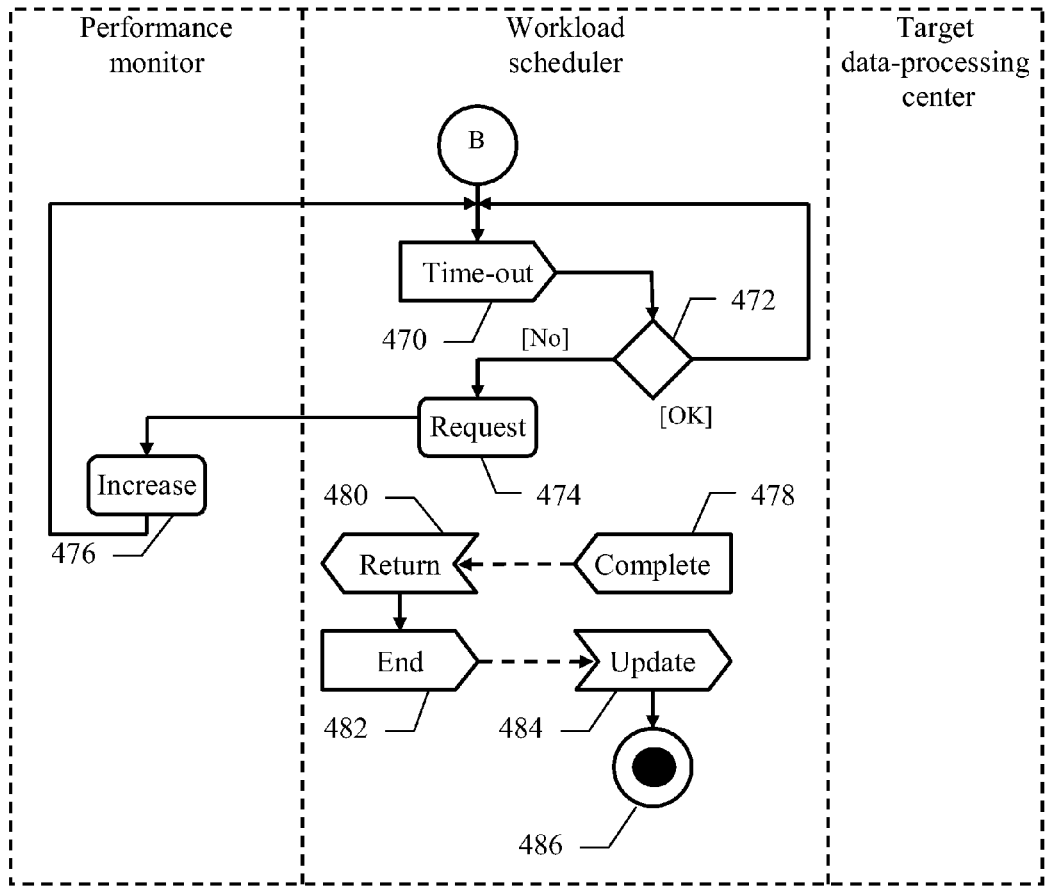

An activity diagram describing a flow of activities relating to an implementation of a solution in accordance with the invention is illustrated in FIGS. 4A through 4C. The activity diagram represents an exemplary process 300 that may be implemented using the system of FIG. 3.

The method 400 begins at start point 402 and proceeds to block 404 in the swim-lane of the scheduler of the data-processing center. In this phase, jobs to be executed during a next production period are retrieved from the workload database. For each job, the energy required to execute the job on the corresponding execution server is estimated at block 406. In one embodiment, this is accomplished by calculating the number of machine instructions associated with the job. The number of machine instructions may be calculated from an expected duration of the job, which may in turn be determined from the actual duration of its previous execution. (Such a technique is described in U.S. Pat. No. 6,944,862, which is herein incorporated by reference). The number of machine instructions of the job may be calculated from the expected duration of the job multiplied by a nominal processing power of its execution server, which may be defined by a corresponding Million Instructions Per Second (MIPS) under standard conditions.

For each execution server, a processing energy E required for execution of the corresponding jobs (for example, defined by their total number of machine instructions) is then determined at block 408 by summing the number of machine instructions of these jobs. This total number of machine instructions needs to be performed on the execution server in a (time) execution window W in which the corresponding jobs can be executed—i.e., from a start time $W_{ini}$ equal to the earliest possible start time of these jobs to an end time $W_{end}$ equal to the latest possible end time of these jobs.

The flow of activity then branches at block 410 according to the structure of the data-processing system. If the data-processing system includes multiple data-processing centers, the method 400 passes to block 412. At this point, for each job (starting from the first job to be executed during the next production period) a corresponding execution request is broadcast from the data-processing center to every other data-processing center (in this context, the data-processing center that issues the execution request is referred to as a source data-processing center and the other data-processing centers are referred to as target data-processing centers). The execution request includes the execution policy of the job (extracted from the corresponding descriptor in the workload database).

Moving to the swim-lane of a generic target data-processing center, a test is performed at block 414 to verify whether the target data-processing center is available to execute the job (e.g., verify whether it includes an execution server having required characteristics). If so, a cost in terms of energy consumption to execute the job is determined at block 416 (including, for example, any additional energy consumption required for operation and cooling of the corresponding execution server). The method 400 then proceeds to block 418. The same block 418 is also reached directly from block 414 when the target data-processing center is not available to execute the job. In either case, an execution response is returned to the source data-processing center. The execution response indicates whether the target data-processing center is available to execute the job, and the corresponding cost if the target data-processing center is available to execute the job.

As soon as execution responses for all of the target data-processing centers have been received by the source data-processing center (or after a predefined time-out period has expired), the scheduler of the source data-processing center selects, at block 420, the data-processing center having the lowest cost for executing the job (among the source data-processing center and target data-processing centers available to execute the job). The method 400 then proceeds to block 422. If the selected data-processing center is one of the target data-processing centers, the job is moved at block 424 to the selected target data-processing center for execution. This may be accomplished by transferring the corresponding descriptor and programs, which may then be removed from the workload database and deleted from the mass memory, respectively, of the source data-processing center.

In response, the selected target data-processing center adds, at block 426, the descriptor of the job to its workload database and saves the corresponding programs into its mass memory so that the job will be scheduled for execution on the selected target data-processing center during its next production period. The method 400 then returns to the swim-lane of the source data-processing center at block 428. The same point is also reached directly from block 422 when the selected data-processing center is the source data-processing center. In this case, the job remains in the workload database of the source data-processing center for scheduling thereon. At block 428, the method determines whether all the jobs have been processed. If not, the flow returns to block 412 to repeat the same operations on a next job to be executed on the source data-processing center.

Referring back to block 410, if the data-processing system includes a single data-processing center the flow of activity continues to block 430. The same point is also reached from block 428 (in the case of multiple data-processing centers, and all jobs to be executed on the source data-processing center during the next production period have been processed). At this point, a power request is submitted from the scheduler to the performance monitor for each execution server on which at least one job has to be executed during the next production period. The power request includes the corresponding processing energy E and execution window W (indicating the total number of machine instructions that are required by the execution server to execute its jobs and when they can be executed, respectively).

In response, the performance monitor calculates the power cap of each execution server (defining its processing power over the execution window W). To accomplish this, the performance monitor at block 432 retrieves, from the monitoring log, the ambient temperature which is expected at the location of the data-processing center during the execution window W. This is defined by a series of ambient temperature values $T_i$ at corresponding instants $t_i$ (e.g., every hour). The ambient temperature values $T_i$ define a temperature function $T(t)$, which models a trend of the ambient temperature over time (i.e., its time pattern) during the execution window W.

Figure 5A:
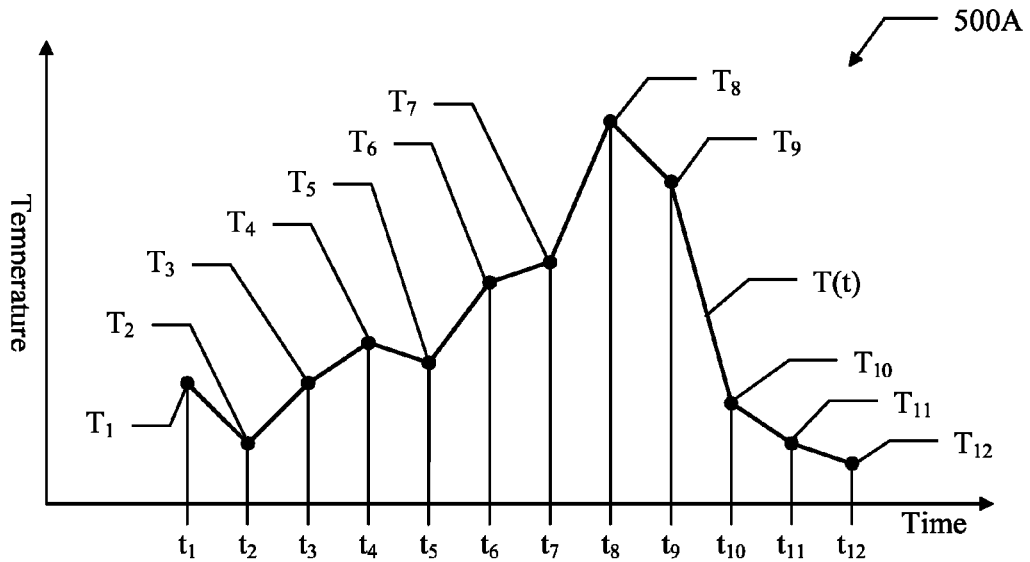
FIGS. 5A through 5F show one example of applying a solution in accordance with the invention.

Referring now to FIG. 5A, a qualitative diagram 500A is illustrated that plots the ambient temperature (on the ordinate) against the time (on the abscissa) during the execution window W. The ambient temperature values $T_i$ are represented by corresponding temperature points defining the ambient temperature values $T_i$ at the instants $t_i$ (with i=1 for $t_1=W_{ini}$ to i=12 for $t_{12}=W_{end}$ in the illustrated example). The temperature function $T(t)$ is represented by a corresponding temperature curve (denoted with the same references for the sake of simplicity—i.e., $T_i$ for the temperature points and $T(t)$ for the temperature curve). The temperature curve $T(t)$ may be simply defined by a piecewise linear (or polygonal) curve consisting of a chain of segments, where each segment is obtained from two adjacent temperature points $T_i$ and $T_{i+1}$ (for i=$W_{ini}$ . . . $W_{end}$−1).

Returning to FIGS. 4A through 4C, the performance monitor calculates a power function $P(t)$, which models a trend of the processing power of the execution server over time during the execution window W. This processing power may be defined by the execution server's processing frequency, which in turn defines the MIPS of the execution server as the product of its processing frequency by its Million Instructions Per Clock (MIPC). The power function $P(t)$ is initially set at block 434 equal to the opposite, with respect to the abscissa axis, of the temperature function $T(t)$ suitably scaled—i.e., $P(t)=-k \cdot T(t)$ (where k is a predefined factor such as $k=10^8$ Hz/° C.). It is possible to calculate a series of power values $P_i=-k \cdot T_i$ at the instants $t_i$ to obtain a discrete representation of the power function $P(t)$.

Figure 5B:
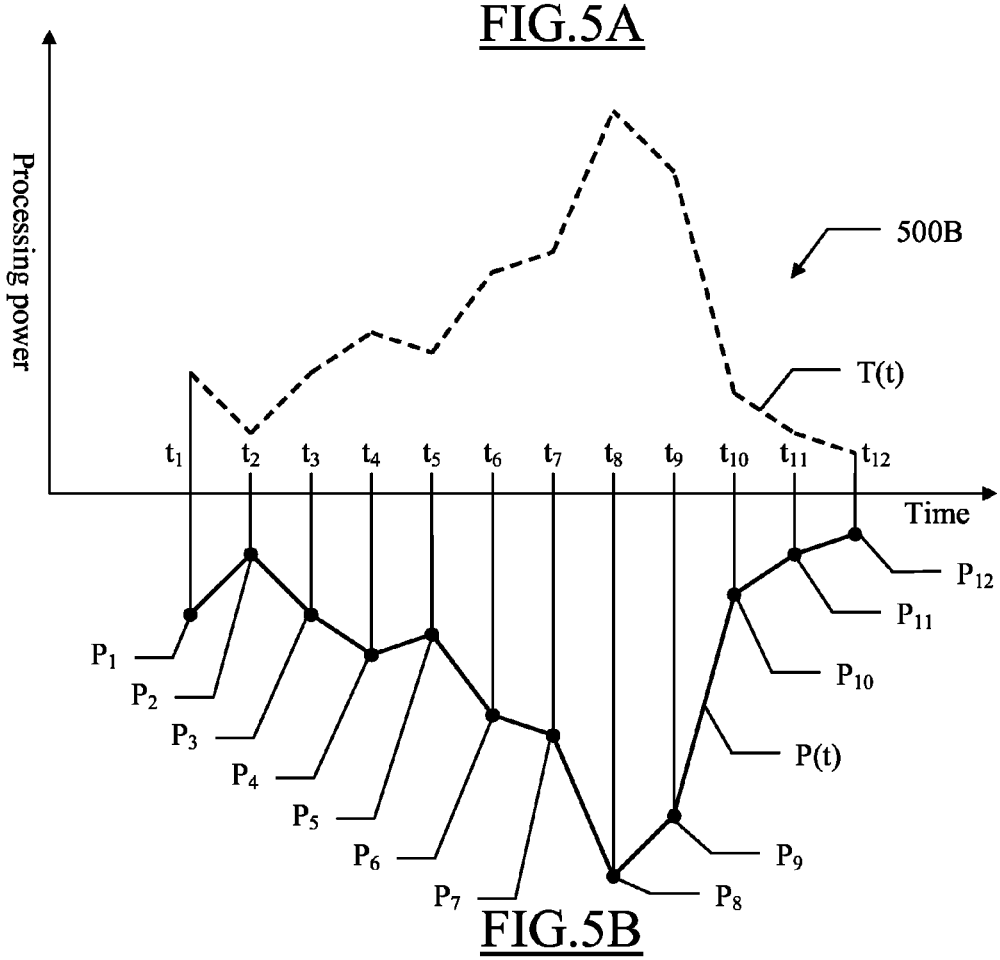

Referring to FIG. 5B, a qualitative diagram 500B is illustrated that plots processing power (on the ordinate) against time (on the abscissa) during the execution window W. The power values $P_i$ are represented by corresponding power points and the power function $P(t)$ is represented by a corresponding power curve (denoted with the same references for the sake of simplicity—i.e., $P_i$ for the power points and $P(t)$ for the power curve). The power curve $P(t)$ is defined by a chain of segments, where each segment is obtained from two adjacent power points $P_i$ and $P_{i+1}$ (for i=$W_{ini}$ . . . $W_{end}$−1).

Figure 5C:
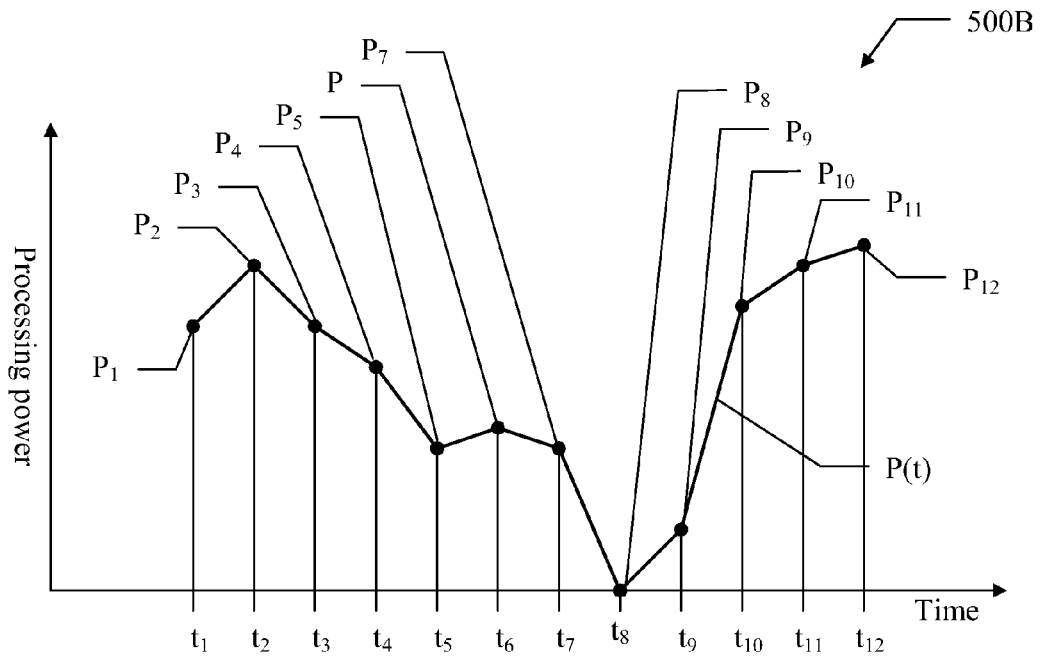

Returning to FIGS. 4A through 4C, the power function $P(t)$ is shifted upwards at block 436 to ensure that it always provides positive values of the processing power in the execution window W. For this purpose, the absolute minimum Min(P) of the power function $P(t)$ in the execution window W is calculated. In the illustrated example, the absolute minimum Min(P) is determined to be the lowest of the power values $P_i$ for i=$W_{ini}$ . . . $W_{end}$ (i.e., Min(P)=$P_8$ in the example shown in FIG. 5B). The power function $P(t)$ is then set to $P(t)=P(t)-$Min(P), so that its absolute minimum Min(P) is equal to 0. In the illustrated example, this is accomplished by setting $P_i=P_i-$Min(P) for i=$W_{ini}$ . . . $W_{end}$ so that $P_8$ is equal to 0 as shown in FIG. 5C).

Continuing to block 438, the power function $P(t)$ is corrected in order to provide the processing energy E required to execute the total number of machine instructions of the corresponding jobs, in the execution window W. For this purpose, a correction factor cf is calculated that defines an upwards or downwards warping of the power function $P(t)$ to make its integral over the execution window W equal to the processing energy E. This correction factor cf may be calculated as follows:

$$cf = \frac{E}{\int_{t=W_{ini}}^{W_{end}} P(t) \cdot dt};$$

In the example at issue, the correction factor cf is simply calculated as:

$$cf = \frac{E}{\sum_{i=W_{ini}}^{W_{end}-1} \frac{(P_i + P_{i+1}) \cdot (t_{i+1} - t_i)}{2}}.$$

Figure 5D:
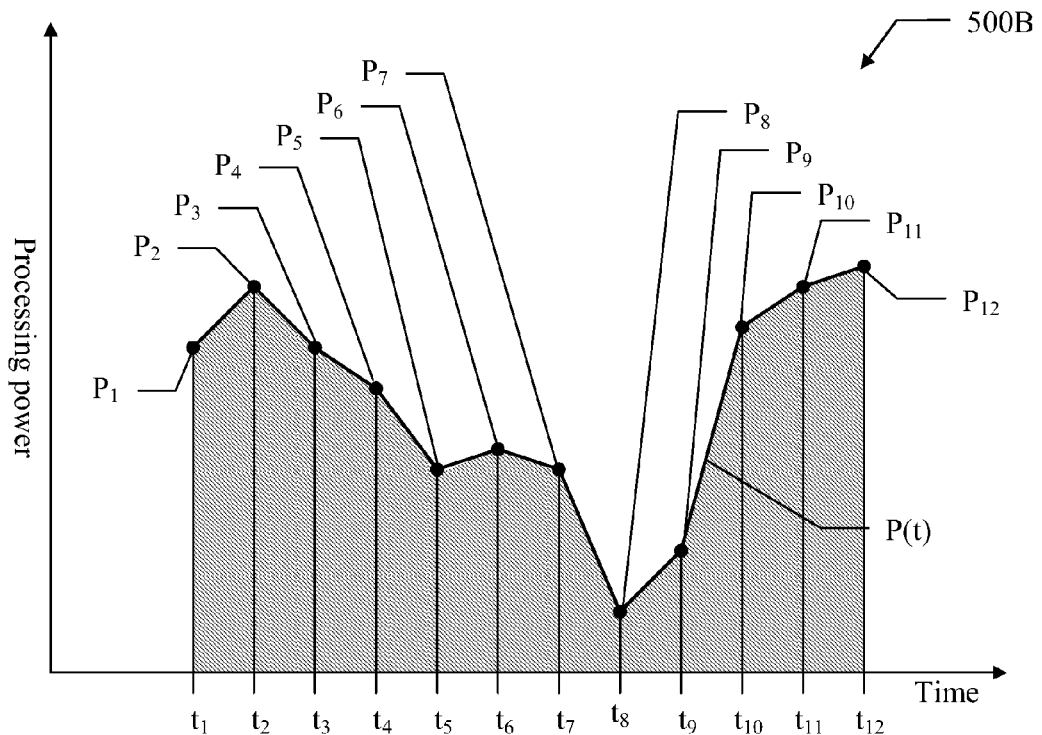

The power function $P(t)$ is then set to $P(t)=cf \cdot P(t)$ to have its integral over the execution window W equal the processing energy E. In the illustrated example, this is accomplished by setting $P_i=cf \cdot P_i$ for i=$W_{ini}$ . . . $W_{end}$. This is shown in FIG. 5D, where the area defining the integral of the power function $P(t)$ is cross-hatched. Proceeding to block 440, the execution server is then controlled according to the obtained power function $P(t)$. For example, the processing power of the execution server (i.e., its processing frequency) may be set to the power value $P_i$ at every instant $t_i$ and be maintained at this value until the next instant $t_{i+1}$. The above-described implementation is very simple from a computational point of view, but also effective to reduce the energy consumption of the data-processing center.

The flow of activity then returns to the swim-lane of the scheduler at block 442 by passing the power cap of each execution server, as defined by its power function P(t) (in the example at issue, the corresponding power values $P_i$). At this point, a new plan defining the flow of execution of the jobs on the corresponding execution servers during the next production period is created. The plan arranges the jobs in the desired sequence according to their run cycles, expected durations, and execution constraints, by taking into account the power cap of the corresponding execution servers.

A test is then performed at block 444 to verify whether the plan can be executed according to the power caps of the execution servers—i.e., whether each execution server can execute the corresponding jobs during a (time) execution frame F in which the jobs are scheduled for execution, from a start time $F_{ini}$ equal to the earliest start time of the jobs to an end time $F_{end}$ equal to the latest end time of the jobs. If not, an increment request is submitted at block 446 from the scheduler to the performance monitor for each execution server whose power cap does not allow correct execution of the corresponding jobs. The increment request includes the processing energy E that is required and the execution frame F.

Figure 5E:
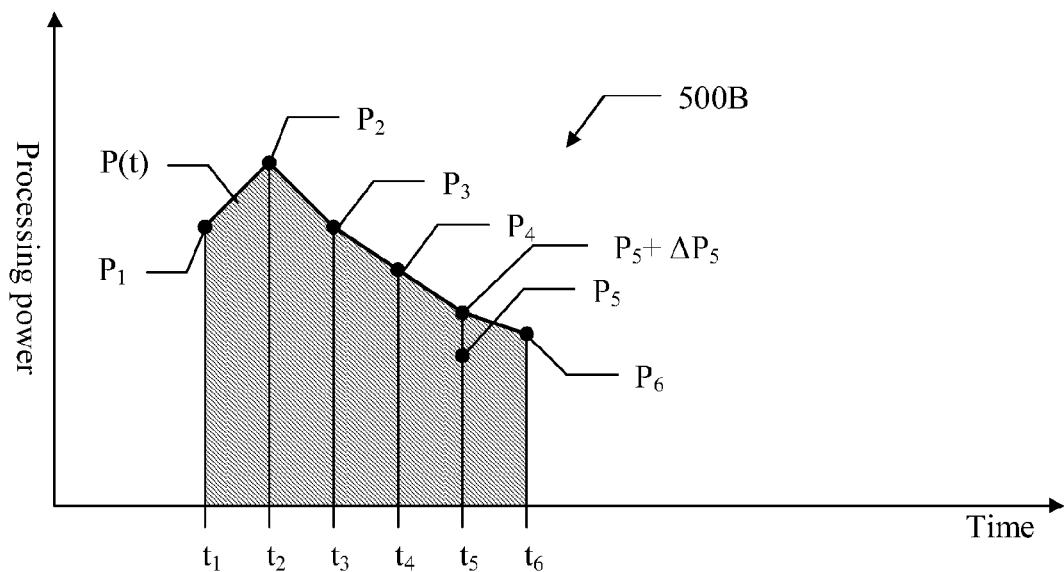

In response, the performance monitor increases the power cap of each of the execution servers. More specifically, at block 448, the performance monitor determines a minimum instant $t_{min}$ corresponding to the absolute minimum Min(P)' of the power function P(t) in the execution frame F In the example at issue, the absolute minimum Min(P)' is simply determined to be the lowest of the power values $P_i$ for i= $F_{ini}...F_{end}$ (i.e., Min(P)'=$P_5$ and $t_{min}$=$t_5$ in the example shown in FIG. 5E). Continuing to block 450, the power function P(t) is increased in correspondence to the minimum instant $t_{min}$. For example, the processing power at the minimum instant $P_{(tmin)}$ is increased by a delta amount ΔP equal to a predefined percentage thereof, such as ΔP=5·P($t_{min}$)/100 (i.e., $P_5$=$P_5$+ ΔP$_5$=$P_5$+0.05·$P_5$=1.05·$P_5$ in the example shown in FIG. 5E). A test is then performed at block 452 to verify whether the integral of the power function P(t) over the execution frame F reaches the required processing energy E. If not, an adjacent instant $t_{adj}$ is selected at block 454. The adjacent instant $t_{adj}$ is selected moving alternatively leftwards and rightwards away from the minimum instant $t_{min}$ (i.e., to the instants $t_4$, $t_6$, $t_3$, $t_7$, and so on in the example at issue). A test is then performed at block 456 to verify whether the adjacent instant $t_{adj}$ belongs to the execution frame F. If so, the processing power at the adjacent instant $t_{adj}$ is likewise increased at block 458 (for example, by the delta amount ΔP=5·P($t_{adj}$)/100).

Figure 5F:
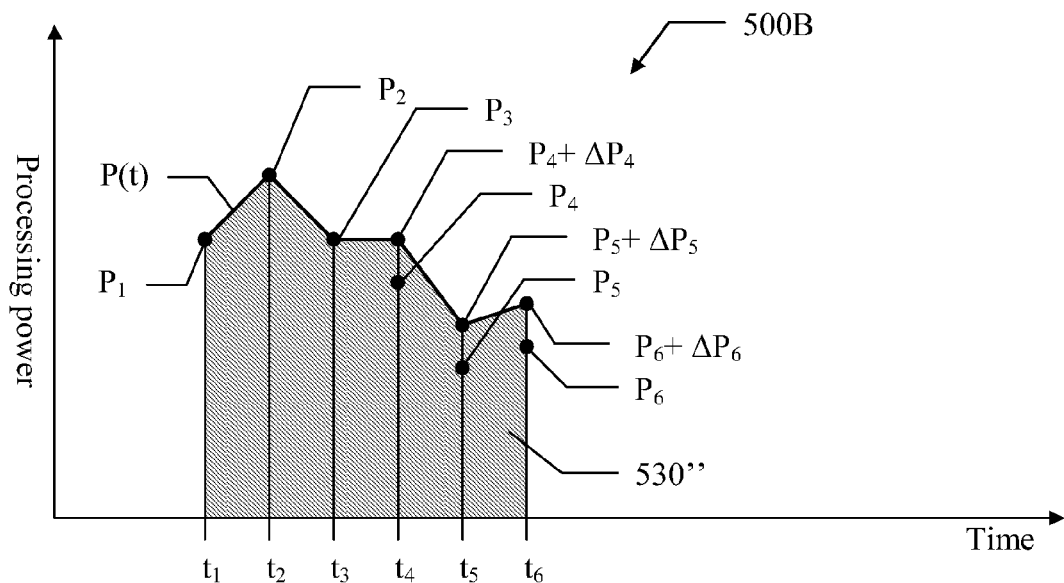

The method 400 then returns to block 452 to repeat the same operations. Conversely, when the adjacent instant $t_{adj}$ does not belong to the execution frame F, the flow of activity proceeds from block 456 to block 460. A test is then performed to verify whether both the start time $F_{ini}$ to the end time $F_{end}$ of the execution frame F have been reached. If not, the method 400 returns to block 452 to repeat the same operations. Conversely, the method 400 returns to block 448 to restart the above-described operations. As soon as the integral of the power function P(t) over the execution frame F reaches the required processing energy E, the flow of activity passes from block 452 to block 462 where the execution server is controlled according to the obtained power function P(t) (i.e., by increasing its processing power at the instants $t_4$, $t_5$, and $t_6$ in the example shown in FIG. 5F). The method 400 then returns to block 444 in the swim-lane of the scheduler by passing the new power cap of each execution server. The above-described implementation is very simple, while at the same time effective.

Referring again to block 444, when the plan can be correctly executed according to the power cap of the execution servers, the plan is started at block 464. Each job is submitted as soon as possible at block 466 so that it executes at block 468. In an asynchronous way, when a predefined time-out expires at block 470 (for example, every 1-5 minutes), the flow of activity proceeds to block 472. A test is then performed to detect any currently executed job that is at risk of not being completed within its time constraints. This may be achieved by estimating a current progress of the job by the performance monitor. This may be determined from the number of machine instructions already performed (which is equal to a number of processing cycles (i.e., clock periods) of the corresponding execution server dedicated to the job multiplied by its processing frequency) divided by its total number of instructions, and an expected progress of the job given by an elapsed time from its start time divided by an allowed duration from its start time to its latest possible end time. The job is deemed late when a safety index, equal to the current progress divided by the expected progress, falls below a threshold such as 0.9 to 0.95 (as described in U.S. Patent Publication No. 20080010642, the entire disclosure of which is incorporated by reference).

If one or more jobs are determined to be late, an additional increment request is submitted at block 474 from the scheduler to the performance monitor for each execution server on which one or more late jobs are being executed. The increment request includes the processing energy that is required to complete the late jobs on time (for example, equal to the sum of a remaining number of machine instructions required to complete the execution of each late job, given by its total number of machine instructions minus the number of machine instructions already performed) and the corresponding execution frame (from a current time to the latest possible end time of the late jobs). In response, the performance monitor at block 476 increases the processing power of each of the execution servers accordingly (by repeating the same operations described above with reference to blocks 448-462).

The method 400 then returns to block 470 in the swim-lane of the scheduler (by passing the new power cap of each executions server), waiting for the expiration of a new time-out. The same point is also reached directly from block 472 when no job is late.

As soon as every job completes execution at block 478, corresponding feedback information is collected at block 480. With reference to block 482, after all the jobs of the plan have been completed or the end of the production period has been reached, the workload database is updated at block 484 in accordance with the collected feedback information. The method 400 then ends at point 486.

In order to satisfy local and specific requirements, a person skilled in the art may logically and/or physically modify or alter the above-described solution. More specifically, although the solution has been described with a certain degree of particularity with reference to one or more embodiments thereof, it should be understood that various omissions, substitutions, and changes in the form and details as well as other embodiments are possible (for example, with respect to various process parameters). Particularly, different embodiments of the invention may be practiced without specific details (such as the numerical examples) set forth in the preceding description to provide a more thorough understanding. On the other hand, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of design choice.

The proposed solution lends itself to be implemented with an equivalent method (e.g., using similar steps, removing steps that are nonessential, or adding optional steps). Moreover, the steps may be performed in a different order, concurrently, or in an interleaved manner.

In certain embodiments, the energy consumption of the data-processing system may be defined in a different way (for example, by means of functions defining the power consumption of the cooling systems against the temperature). Moreover, the same solution may be applied to different types of data-processing jobs (such as interactive tasks, web services, or even job streams consisting of ordered sequences of logically related jobs that should be executed as a single work unit). More generally, the execution scheme of the jobs on the data-processing system (calculated so as to optimize the energy consumption of the data-processing system according to the ambient temperature of the corresponding execution servers) may control the execution of the jobs in any other way (for example, when the jobs are executed, on which execution servers the jobs are executed, with which resources the jobs are executed, or combinations thereof).

In certain embodiments, the ambient temperature of the execution servers may be considered as a group (for example, several execution servers arranged in the same room) or individually (for example, to take into account their position within a data-processing center relative to a cooling systems). The ambient temperature may also be estimated according to historical information (either provided by a weather forecast service or collected locally by a dedicated monitoring agent), or according to a standard time-pattern (for example, with higher values during the day and lower values during the night).

Moreover, it is possible to calculate other exploitation trends for each execution server (e.g., indicative of a time pattern of exploitation of corresponding resources during the production period), and control the execution server accordingly. For example, an exploitation trend may relate to other resources of the execution servers (e.g., their network bandwidth).

The processing power of the execution servers may be defined in other ways, such as according to a number of microprocessors that can be enabled and disabled dynamically.

Other approaches are possible to calculate the exploitation trend of each execution server. For example, in a more sophisticated implementation, it is possible to create an actual temperature function (e.g., fitting the temperature values with a predefined mathematical function, such as a B-spline, with standard optimization algorithms), and then to obtain a power function analytically from the temperature function.

The resource requirement of each execution server may also be estimated in other ways (for example, statistically according to the number of instructions of the corresponding jobs).

Similar algorithms may be used to calculate the power function (or its discrete representation provided by the power values). For example, the power function may be corrected by simply shifting it upwards or downwards (so as to make its integral equal to the required processing energy).

Alternatively, it is possible to create the plan first, and then to set the power caps of the execution servers accordingly. This will ensure that all of the execution servers are suitable to execute the corresponding jobs in compliance with their execution constraints.

The progress of jobs may also be monitored with a different periodicity. It is also possible to assess the progress of jobs according to different measures (for example, their number of I/O operations). However, monitoring the progress of jobs to update the power cap of execution servers dynamically may be omitted in a simplified implementation of the proposed solution. Additionally or alternatively, it is possible to monitor the energy consumption of a data-processing system to update the processing frequency of its execution servers in order to match a predefined energy consumption goal.

In any case, it is possible to update the power cap of execution servers (when they are unsuitable to allow and/or at risk of not allowing the execution of corresponding jobs in compliance with corresponding execution constraints) in any other way (for example, by increasing the processing frequency of the execution servers in correspondence to lower temperature values, or even by simply shifting the power function upwards).

The cost for executing jobs on other data-processing centers may also be defined in different ways, such as by taking into account the effort required to move jobs thereto). Of course, the above-described solution also lends itself to be carried out on a single data-processing center, without the possibility of moving jobs to other data-processing centers.

The proposed solution may be implemented as a stand-alone module, as a plug-in for a scheduler, or even directly in a scheduler. It should be apparent that it is also possible to deploy the same solution as a service that is accessed over a network, such as over the Internet. In any case, similar considerations apply if a program used to implement an embodiment of the invention is structured in a different way, or if additional modules or functions are provided. Likewise, memory structures may be of other types, or may be replaced with equivalent entities (not necessarily consisting of physical storage media). A program may take any form suitable for use with a data-processing system or in connection therewith (for example, within a virtual machine). The program may be in the form of external or resident software, firmware, or microcode (either in object code or source code, for example, to be compiled or interpreted). Moreover, it is possible to provide the program on any computer-usable medium. The medium can be any element suitable to contain, store, communicate, propagate, or transfer the program. For example, the medium may be of the electronic, magnetic, optical, electromagnetic, infrared, or semiconductor type. Examples of such medium include fixed disks (where the program can be pre-loaded), removable disks, tapes, cards, and the like. In any case, the solution lends itself to be implemented even with a hardware structure (for example, integrated into a chip of semiconductor material), or with a combination of software and hardware suitably programmed or otherwise configured.

The proposed method may also be carried out on a system based on a different architecture (for example, a local, wide-area, global, or satellite network), and exploiting any type of (wired and/or wireless) connection. However, its implementation on a stand-alone mainframe is not excluded. Moreover, each computer may have another structure or may include similar elements (such as cache memories temporarily storing the programs or parts thereof). In any case, the same solution may be applied to other data-processing units or combinations thereof (for example, storage systems, router systems, and the like).

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for optimizing energy consumption in a data-processing system including a set of data-processing units, the method comprising:
    indicating a set of data-processing jobs to be executed on the data-processing system during a production period;
    estimating an ambient temperature expected for each data-processing unit during the production period, wherein estimating the ambient temperature comprises estimating a temperature trend for each data-processing unit during the production period;
    calculating an execution scheme for the data-processing jobs on the data-processing system, the execution scheme optimizing energy consumed by the data-processing system to execute the data-processing jobs based on the ambient temperature of the data-processing units, wherein calculating the execution scheme comprises calculating, based on the temperature trend, an exploitation trend for exploiting a set of resources on each data-processing unit to optimize energy consumed by the data-processing units during the production period, and creating a plan of execution for executing the data-processing jobs on the data-processing units during the production period; and
    executing the data-processing jobs on the data-processing system according to the execution scheme.

2. The method of claim 1, wherein the data-processing system includes at least one data-processing center at a corresponding location, and estimating an ambient temperature for each data-processing unit during the production period comprises estimating an external temperature expected at the location during the production period.

3. The method of claim 2, wherein estimating an external temperature expected at the location comprises retrieving a weather forecast for the location during the production period.

4. The method of claim 1, wherein the resources of each data-processing unit include a processing power of the data-processing unit.

5. The method of claim 4, wherein the processing power of each data-processing unit includes a processing frequency of the data-processing unit.

6. The method of claim 1, further comprising estimating a resource requirement of each data-processing unit by:
    estimating a number of machine instructions of each data-processing job to be executed on the data-processing unit according to a nominal processing power of the data-processing unit and an expected duration of the job, the expected duration of the job being estimated according to an actual duration of previous executions of the job; and
    summing the number of machine instructions of the data-processing jobs to be executed on the data-processing unit.

7. The method of claim 1, wherein calculating the exploitation trend of each data-processing unit comprises:
    setting the exploitation trend to an opposite of the temperature trend during the execution window scaled by a scaling factor;
    shifting the exploitation trend to have an absolute minimum thereof in the execution window equal to a null value; and
    correcting the exploitation trend to have an integration thereof over the execution window equal to the resource requirement of the data-processing unit.

8. The method of claim 1, wherein each data-processing job is subject to a set of execution constraints, and calculating the exploitation trend of each data-processing unit comprises:
    determining which data-processing units are unsuitable to execute the corresponding data-processing jobs in compliance with the execution constraints according to the exploitation trend of the data-processing unit; and
    updating the exploitation trend of each unsuitable data-processing unit to make the data-processing unit suitable to execute the corresponding data-processing jobs in compliance with the execution constraints.

9. The method of claim 8, further comprising:
    monitoring the execution of the data-processing jobs to detect which data-processing units are at risk of not executing the corresponding data-processing jobs in compliance with the execution constraints according to the exploitation trend; and
    updating the exploitation trend of each at risk data-processing unit to make the data-processing unit capable of executing the corresponding data-processing jobs in compliance with the execution constraints.

10. The method of claim 9, wherein updating the exploitation trend of a data-processing unit that is one of unsuitable to execute the corresponding data-processing jobs and at risk of not executing the corresponding data-processing jobs comprises:
    determining a further absolute minimum of the temperature trend in a further execution window of the corresponding data-processing jobs to be executed on the data-processing unit; and
    increasing the exploitation trend of the data-processing unit in correspondence to the further absolute minimum.

11. The method of claim 1, wherein the data-processing system includes a plurality of data-processing units at different locations, and calculating an execution scheme for the data-processing jobs comprises selecting a data-processing unit to execute each data-processing job to optimize the energy consumed according to the ambient temperature of the plurality of data-processing units.

12. A computer program product for optimizing energy consumption in a data-processing system including a set of data-processing units, the computer program product comprising:

a non-transitory computer-readable storage medium storing computer instructions which when executed by at least one processor cause the at least one processor to:

indicate a set of data-processing jobs to be executed on the data-processing system during a production period;

estimate an ambient temperature expected for each data-processing unit during the production period, wherein estimating the ambient temperature comprises estimating a temperature trend for each data-processing unit during the production period;

calculate an execution scheme for the data-processing jobs on the data-processing system, the execution scheme optimizing energy consumed by the data-processing system to execute the data-processing jobs based on the ambient temperature of the data-processing units, wherein calculating the execution scheme comprises calculating, based on the temperature trend, an exploitation trend for exploiting a set of resources on each data-processing unit to optimize energy consumed by the data-processing units during the production period, and creating a plan of execution for executing the data-processing jobs on the data-processing units during the production period; and execute the data-processing jobs on the data-processing system according to the execution scheme.

13. The computer program product of claim 12, wherein the data-processing system includes at least one data-processing center at a corresponding location, and estimating an ambient temperature for each data-processing unit during the production period comprises estimating an external temperature expected at the location during the production period.

14. The computer program product of claim 13, wherein estimating an external temperature expected at the location comprises retrieving a weather forecast for the location during the production period.

15. The computer program product of claim 12, wherein the resources of each data-processing unit include a processing power of the data-processing unit.

16. The computer program product of claim 15, wherein the processing power of each data-processing unit includes a processing frequency of the data-processing unit.

17. The computer program product of claim 12, wherein the computer instructions further cause the at least one processor to estimate a resource requirement of each data-processing unit by:

estimating a number of machine instructions of each data-processing job to be executed on the data-processing unit according to a nominal processing power of the data-processing unit and an expected duration of the job, the expected duration of the job being estimated according to an actual duration of previous executions of the job; and summing the number of machine instructions of the data-processing jobs to be executed on the data-processing unit.

18. The computer program product of claim 12, wherein calculating the exploitation trend of each data-processing unit comprises:

setting the exploitation trend to an opposite of the temperature trend during the execution window scaled by a scaling factor;

shifting the exploitation trend to have an absolute minimum thereof in the execution window equal to a null value; and correcting the exploitation trend to have an integration thereof over the execution window equal to the resource requirement of the data-processing unit.

19. The computer program product of claim 12, wherein each data-processing job is subject to a set of execution constraints, and calculating the exploitation trend of each data-processing unit comprises:

determining which data-processing units are unsuitable to execute the corresponding data-processing jobs in compliance with the execution constraints according to the exploitation trend of the data-processing unit; and updating the exploitation trend of each unsuitable data-processing unit to make the data-processing unit suitable to execute the corresponding data-processing jobs in compliance with the execution constraints.

20. An apparatus for optimizing energy consumption in a data-processing system including a set of data-processing units, the apparatus comprising:

at least one processor; and at least one memory device coupled to the at least one processor and storing computer instructions for execution on the at least one processor, the computer instructions causing the at least one processor to:

indicate a set of data-processing jobs to be executed on the data-processing system during a production period;

estimate an ambient temperature expected for each data-processing unit during the production period, wherein estimating the ambient temperature comprises estimating a temperature trend for each data-processing unit during the production period;

calculate an execution scheme for the data-processing jobs on the data-processing system, the execution scheme optimizing energy consumed by the data-processing system to execute the data-processing jobs based on the ambient temperature of the data-processing units, wherein calculating the execution scheme comprises calculating, based on the temperature trend, an exploitation trend for exploiting a set of resources on each data-processing unit to optimize energy consumed by the data-processing units during the production period, and creating a plan of execution for executing the data-processing jobs on the data-processing units during the production period; and execute the data-processing jobs on the data-processing system according to the execution scheme.

21. The apparatus of claim 20, wherein the data-processing system includes at least one data-processing center at a corresponding location, and estimating an ambient temperature for each data-processing unit during the production period comprises estimating an external temperature expected at the location during the production period.

* * * * *